United States Patent

Hagemann et al.

[11] 3,956,089
[45] May 11, 1976

[54] PROCESS FOR PRODUCING N-CHLOROCARBONYL ISOCYANIDE DICHLORIDE

[75] Inventors: Hermann Hagemann, Cologne; Herbert Schwarz, Opladen; Fritz Döring, Odenthal-Gloebusch, all of Germany

[73] Assignee: Bayer Aktiengesellschaft, Leverkusen, Germany

[22] Filed: Jan. 24, 1975

[21] Appl. No.: 544,021

[30] Foreign Application Priority Data
Feb. 2, 1974  Germany............................ 2405005

[52] U.S. Cl........................................ 204/158 HA
[51] Int. Cl.².............................................. B01J 1/10
[58] Field of Search.............................. 204/158 HA

[56] References Cited
UNITED STATES PATENTS
3,535,360  10/1970  Holtschmidt et al......... 204/158 HA

*Primary Examiner*—Howard S. Williams
*Attorney, Agent, or Firm*—Burgess, Dinklage & Sprung

[57] ABSTRACT

N-chlorocarbonyl isocyanide dichloride is prepared by chlorinating methyl isocyanate and/or methyl carbamic acid chloride in solution in the presence of ultraviolet light at a temperature in the range of from 30° to 120°C. The temperature pattern during the reaction is controlled in relation to the concentration of methyl isocyanate in the reaction mixture such that low temperatures are maintained for high concentrations while high temperatures are maintained with low concentrations. Thus, when a temperature of from 30°–40°C is maintained during the reaction, the concentration of methyl isocyanate in the reaction mixture is substantially more than 50 percent; when the temperature is increased to 65° to 75°C, the concentration of methyl isocyanate is in the range of 50 percent to 10 percent; and when the temperature is increased above 75°C, the concentration of methyl isocyanate is substantially below 10 percent.

5 Claims, 2 Drawing Figures

PROCESS FOR PRODUCING N-CHLOROCARBONYL ISOCYANIDE DICHLORIDE

BACKGROUND

This invention relates to the preparation of N-chlorocarbonyl isocyanide dichloride via the chlorination of methyl isocyanate and/or methyl carbamic acid chloride.

It is known that $\alpha$-halogen isocyanates can be obtained by chlorinating isocyanates or their HCl-adducts, namely carbamic acid chlorides (German Offenlegungsschrift No. 1,122,058). It is also known that, in the case of perchlorinated methyl isocyanate, it is only the chlorotropic form, namely N-chlorocarbonyl isocyanide dichloride, which is present (Angewandte Chemie, Vol. 74, page 849 (1962)), although the known process for producing N-chlorocarbonyl isocyanide dichloride is not suitable for working on a commercial scale on account of the low yields obtained.

SUMMARY

It has now been found that N-chlorocarbonyl isocyanide dichloride can be obtained by chlorinating methyl isocyanate and/or methyl carbamic acid chloride in solution in the presence of ultraviolet light by a process which is characterised by the fact that, in the range from approximately 30° to 120°C, the temperature pattern during the reaction is controlled in relation to the concentration of methyl isocyanate in the reaction mixture so that low temperatures are maintained with high concentrations and high temperatures are maintained with low concentrations. It has proved to be advantageous, in the case of relatively high concentrations of methyl isocyanate in the reaction mixture, to begin the reaction at temperatures between 30° and 40°C and to complete it by increasing temperature. The temperature should not be increased beyond about 65° to about 75°C, the reaction advantageously being completed at around 70°C.

DESCRIPTION OF THE DRAWING

The present invention will be more fully understood from the following description taken in conjunction with the accompanying drawing wherein.

DESCRIPTION

Figure 1:
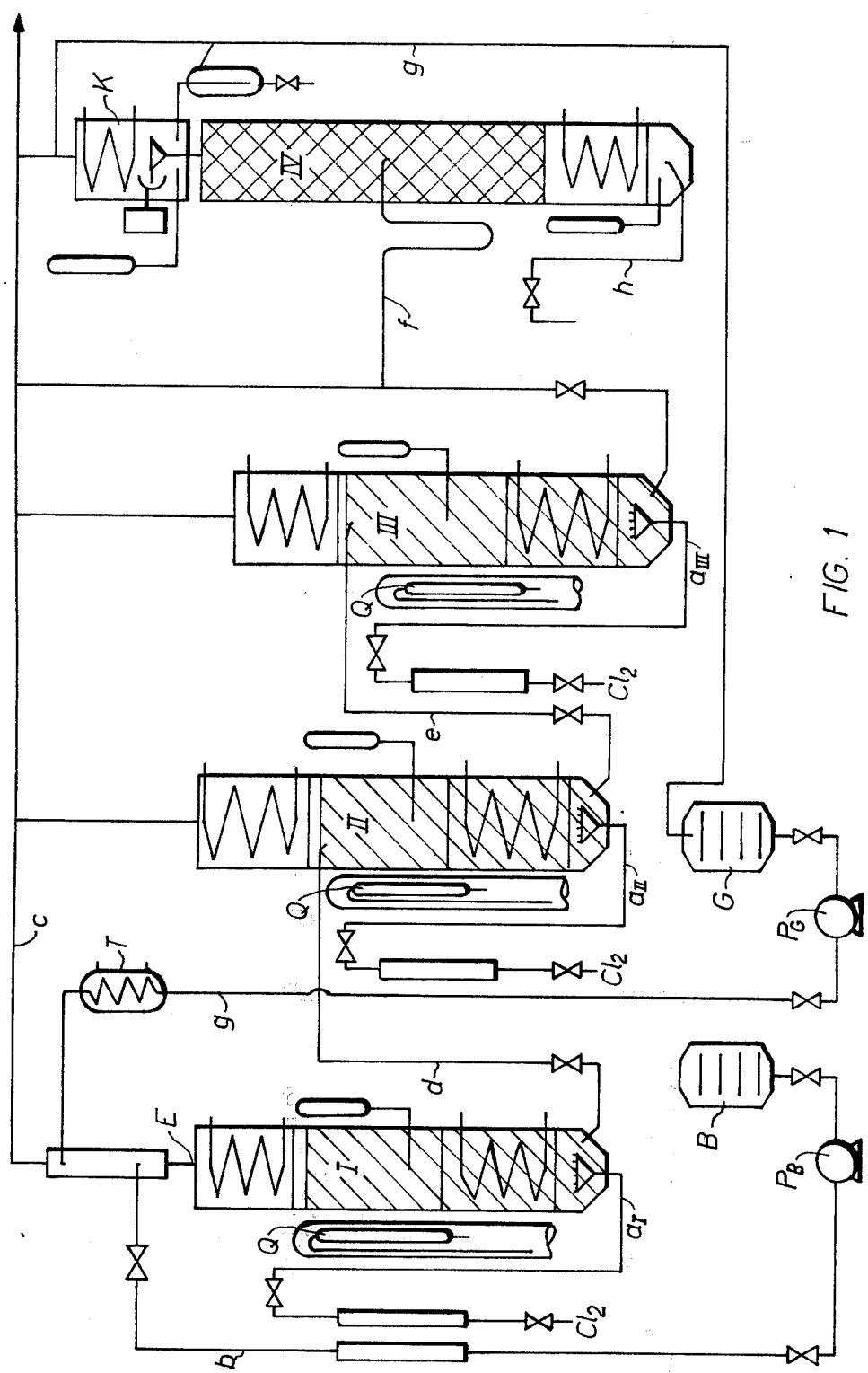
FIG. 1 is a schematic flow diagram of suitable apparatus for carrying out the invention on a continuous basis.

However, when the starting mixture contains only a low concentration of methyl isocyanate or when the reaction mixture contains only a little unreacted starting material, for example less than 10% and, more especially, less than 5% of the original quantity of starting material, it is possible to exceed the limit of 75°C and to allow the temperature to rise up to the boiling temperature of the N-chlorocarbonyl isocyanide dichloride.

In the reaction on which the process according to the invention is based, a temperature of from about 30°C to 40°C is maintained, for example with concentrations of more than about 50% of methyl isocyanate in the reaction mixture, and the temperature is increased to from 65° to 75°C for concentrations of from about 50 to 10%, and to beyond 75°C for concentrations below about 10%.

The solvent used is, with particular advantage, carbon tetrachloride or the end product of the reaction, N-chlorocarbonyl isocyanide dichloride, or a mixture of both. It is preferred to use N-chlorocarbonyl isocyanide dichloride.

So far as the practical application of the process according to the invention is concerned, it is essential for the intensity of the ultraviolet radiation to be as high as possible. This can be achieved, for example, by using powerful radiation sources or by keeping the layer through which the ultraviolet rays have to pass correspondingly thin. Accordingly, it is advantageous to use powerful immersion-type UV-lamps. In addition, the bulbs used and cooling jacket, if any, should have as high a level of permeability to ultraviolet radiation as possible. In addition, any cooling liquid which may be necessary will also be selected with this requirement in mind. It is best to use light souces which despite high intensity have a maximum radiation at about 300 to 400 nm. Above all, high UV-intensity is also achieved by using carbon tetrachloride or N-chlorocarbonyl isocyanide dichloride or mixtures of both as solvent. The aforementioned solvents show high permeability to UV-light and are photostable over relatively long periods.

Methyl isocyanate and methyl carbamic acid chloride which are used as starting compounds in the process according to the invention are already known and may be obtained in known manner, for example by reacting methylamine and phosgene. The methyl carbamic acid chloride which may be obtained in this way can be converted into methyl isocyanate by heating. In some cases, however, it may be of particular advantage to use a mixture of carbamic acid chloride and methyl isocyanate, of the type obtained as reaction mixture by reacting methylamine and phosgene, instead of the pure compounds as starting material.

Chlorine is used in at least the stoichiometrically necessary quantity of 3 mols per mol of methyl isocyanate and/or methyl carbamic acid chloride. It can be of advantage to use an excess of up to 5 mol %, more especially 0.5 mol %.

Maintaining the special temperature pattern as a function of concentration is a critical feature of the process according to the invention by which undesirable secondary reactions are, surprisingly, substantially avoided. Compared with the conventional process, the process according to the invention gives considerably improved yields which enable the process to be economically used.

The process according to the invention may be carried out for example by introducing methyl isocyanate into the solvent used, maintaining an excess of chlorine in the reaction mixture through the introduction of chlorine and heating the reactior mixture in the presence of ultraviolet light. In one preferred embodiment, N-chlorocarbonyl isocyanide dichloride is initially introduced as solvent and the methyl isocyanate is added in such a quantity that the concentration of unreacted methyl isocyanate in the reaction mixture does not exceed approximately 5%. An excess of chlorine is introduced at the same time as the methyl isocyanate. In this embodiment, temperatures in the range from about 75° to 120°C and, preferably, of the order of 100°C are maintained in accordance with the process of the invention. One particular advantage of this embodiment is the fact that the temperature pattern is easy to control, in addition to which the waste gas is saved from pollution by an additional solvent.

The process according to the invention can of course also be carried out continuously. In this case, the reaction may be completely carried out in one stage with a correspondingly long residence time and a temperature gradient within the stage, for example a reaction column, or alternatively the reaction may be carried out incompletely in several stages at different temperatures and completed in the final stage. This particular embodiment, which can be of particular advantage, is described by way of example in the following, being carried out in the apparatus illustrated diagrammatically in FIG. 1. The reaction vessels I, II and III are provided at their lower ends with an inlet for chlorine which is finely dispersed through a sieve plate. They can be heated over their respective lower thirds by means of a heating coil, whilst their respective upper thirds are surrounded by a cooling coil on which volatilising fractions of the contents recondense. The middle third of each vessel is irradiated by a high-intensity UV-radiation source Q. The reaction vessels are followed by a distillation stage IV from the sump of which the reaction product is run off through the pipe $h$, whilst the solvent is run off overhead through a pipe $g$ after condensation in the condenser K, and recycled to the process, optionally after the addition of fresh solvent to replace any losses. The starting material and the solvent are delivered to the reaction vessel I overhead from the containers B and G by means of the pumps $P_b$ and $P_g$ and pipes $b$ and $g$, for example in a ratio of 1:5. The carbon tetrachloride may have been precooled in the condenser T. Of the total quantity of chlorine, 25% for example are introduced through the pipe $a_I$. The temperature prevailing in the reaction vessel I is maintained at 35°C for example, and a theoretical residence time of the reaction mixture in the reaction vessel I is adjusted to, for example, 4 hours. The reaction mixture is run off from the reaction vessel I at its lower end and delivered through a pipe $d$ below the condenser into the reaction vessel II, run off from the reaction vessel II, again at its lower end, introduced through a pipe $e$ into the reaction vessel III at the same place as in reaction vessel II, run off from the reaction vessel III through a pipe $f$, again at its lower end, and introduced in the middle of the distillation column IV. The reaction vessels II and III are maintained at a temperature of 70°C for example, and the theoretical residence time of the reaction mixture in them is adjusted for example to approximately 12 hours. This can be done for example by correspondingly dimensioning the reaction vessels or by other known measures. Chlorine is delivered to them through the pipes $a_{II}$ and $a_{III}$ in a quantity sufficient to produce a ratio of 5:4:3 for example to the quantity of chlorine introduced into the reaction stage I. The reaction apparatus as a whole is pressure-equalised and vented through the pipe $c$.

In one particularly preferred variant of this embodiment, N-chlorocarbonyl isocyanide dichloride may be used as solvent instead of carbon tetrachloride, and the methyl isocyanate is introduced into reaction vessels I and II in such a way that the concentration of unreacted methyl isocyanate does not exceed about 2%. According to the invention, temperatures of the order of 100°C are used in this embodiment. Since the solvent does not have to be distilled off and since a degree of chlorination of around 85 to 95% is actually reached in reaction vessel I, increasing to 100% in reaction vessel II, reaction vessel III is redundant. All that is required to work up the reaction mixture is a degassing column, whilst an evaporator, for example a falling film evaporator or a rotary thin-layer evaporator, may be used for separating the N-chlorocarbonyl isocyanide dichloride from the residue.

The process according to the invention may be carried out continuously and with particular advantage by reacting methylamine and phosgene, for example in a reaction tube. to form a mixture of methyl isocyanate and methyl carbamic acid chloride and subsequently reacting the resulting reaction mixture continuously, as described above, by the process according to the invention.

N-Chlorocarbonyl isocyanide dichloride is a valuable intermediate product, especially for the production of plant-protection agents. For example, reaction with methanol gives methoxy carbonyl isocyanide dichloride which may be reacted with o-phenylene diamine in a smooth reaction to give benzimidazole carbamic acid methyl ester which is a valuable fungicide (German Offenlegungsschrift No. 1,900,755; German Auslegeschrift No. 1,932,297; and U.S. Pat. No. 2,593,504).

EXAMPLE 1

A 1-liter three-necked flask equipped with a reflux condenser, thermometer and a gas inlet pipe terminating just above its base and closed off by means of a glass frit was used. 210 g of chlorine were introduced into the flask over a period of 3 hours at 35° to 38°C into a mixture of 135 g of methyl isocyanate and 480 g of carbon tetrachloride in the presence of light from a mercury vapour lamp of the type Q 80 "Hanau". With the lamp still on, the temperature was increased to 70°C over a period of 3 hours, 30 g of chlorine being introduced every hour. With the lamp still on, the reaction mixture was kept at that temperature for a period of 12 hours during which chlorine was introduced at a rate of approximately 20 g per hour.

On completion of chlorination, the crude mixture obtained was distilled under normal pressure in a 50 cm long column filled with 5 mm diameter Raschig rings. A mixture of 440 g of carbon tetrachloride and 45 g of N-chlorocarbonyl isocyanide dichloride was thus obtained in the boiling range from 76° to 115°C/760 Torr, whilst 296 g of N-chlorocarbonyl isocyanide dichloride ($n_D^{20} = 1.4785$) was obtained in the boiling range from 115° to 118°C/760 Torr. The total yield amounted to 341 g (89.6% of the theoretical yield).

EXAMPLE 2

In the apparatus described in Example 1, 171 g of methyl isocyanate were introduced over a period of 3 hours at 35° to 45°C into 500 g of N-chlorocarbonyl isocyanide dichloride through an additional inlet pipe terminating just above the base of the flask. At the same time, chlorine was introduced at a rate of 71 g per hour throughout the entire reaction in the presence of UV light, as described in Example 1. Chlorine was then introduced at a rate of 20 g per hour for another 3 hours at approximately 45°C, the temperature subsequently increased over a period of 2 hours to approximately 70°C and kept at that level for another 15 hours. In the meantime, chlorine was introduced still at the rate of 20 g per hour.

The reaction mixture was then subjected to fractional distillation in the same way as in Example 1. 337 g (70% of the theoretical yield) of N-chlorocarbonyl isocyanide dichloride were obtained in the boiling range from 115 to 118°C/760 Torr.

EXAMPLE 3

The apparatus diagrammatically illustrated in FIG. 1 was used for the production of N-chlorocarbonyl isocyanide dichloride.

The reaction vessels I (capacity 1 liter), II and III (each with a capacity of 1.5 liters), 42 cm long and 6 and 7 cm, respectively, in diameter, were provided at their lower ends with an inlet for chlorine which was finely dispersed through a sieve plate. The reaction vessels could be heated over their respective lower thirds by means of a heating coil, whilst their respective upper thirds were surrounded by a cooling coil on which volatilising fractions of the contents recondense. The cooling liquid had a temperature of 10°C in stage I and a temperature of 0°C in stages II and III. The middle third was irradiated in each case by a high-intensity UV radiation source Q. The reaction vessels were followed by a distillation stage IV, consisting of a 2 liter capacity sump and a column 5 cm in diameter and 150 cm long which, at its upper end, was provided with an automatic reflux divider.

Before the beginning of the reaction, the reaction vessel I was filled to overflowing with 1 liter of carbon tetrachloride, whilst reaction vessels II and III were each filled with 1.5 liters and distillation column IV with 1 liter of N-chlorocarbonyl isocyanide dichloride. Each reaction vessel overflowed through the pipes $d$, $e$, $f$ and $h$, respectively, into the following reaction vessel or column, and so on, into the receiver for N-chlorocarbonyl isocyanide dichloride. The air displaced could escape through pipe $c$.

The reaction vessel I was then heated to the reaction temperature of 35°C and reaction vessels II and III to the reaction temperature of 70°C whilst the distillation column IV was heated until a sump temperature of 115°C was reached. These temperatures were maintained while the reaction was in progress by regulating the heating. 41 ml/h of methyl isocyanate ($\triangleq 40$ g) as starting material and 200 ml/h of carbon tetrachloride as solvent, in a ratio of 1:5 parts by volume, were delivered to the reaction stage I from the storage vessels B and G through the pumps $P_b$ and $P_g$ and the pipes $b$ and $g$. Accordingly, the theoretical residence time in the reaction stage I was 4 hours. The carbon tetrachloride was precooled in the condenser T through which brine at $-15$°C flowed. The inlet E was designed so that the carbon tetrachloride washed over the cooling coil and flushed any methyl carbamic acid chloride settling thereon back into the reaction zone. At the same time, 30% of the quantity of chlorine theoretically required for reacting the methyl isocyanate (approximately 50 g per hour) were delivered through the pipe $a_I$.

The reaction mixture then passed through pipe $d$ into the reaction stage II, to which 50% of the theoretically necessary quantity of chlorine (approximately 75 g per hour) were simultaneously delivered through the pipe $a_{II}$. The theoretical residence time in this reaction zone amounted to 6 hours.

The reaction mixture also flowed through the pipe $e$ to the reaction stage III in which it also remained for a theoretical residence time of 6 hours. Another 40% of the theoretically necessary quantity of chlorine (approximately 60 g per hour) were delivered to this reaction stage through the pipe $a_{III}$. The total quantity of chlorine delivered (approximately 185 g per hour) thus amounted to 120% of the theoretically necessary quantity.

The reaction mixture left the reaction stage III through the pipe $f$ and was introduced into the middle of the distillation column IV. The reflux ratio in the distillation column IV was 4:1 (reflux:distillate). The carbon tetrachloride moving off overhead was condensed in the condenser K and returned through the pipe $g$ to the storage vessel G.

The crude N-chlorocarbonyl isocyanide dichloride was run off from the sump of the column through the pipe $h$. In addition to approximately 3% by weight of carbon tetrachloride, it contained from 1 to 2% by weight of higher-boiling impurities. In the equilibrium state of the continuous reaction, the yield of N-chlorocarbonyl isocyanide dichloride amounted to 108 g per hour (90% of the theoretical yield) with a purity of 95% by weight.

The aforementioned theoretical residence times were each based on the corresponding aforementioned volume.

EXAMPLE 4

Figure 2:
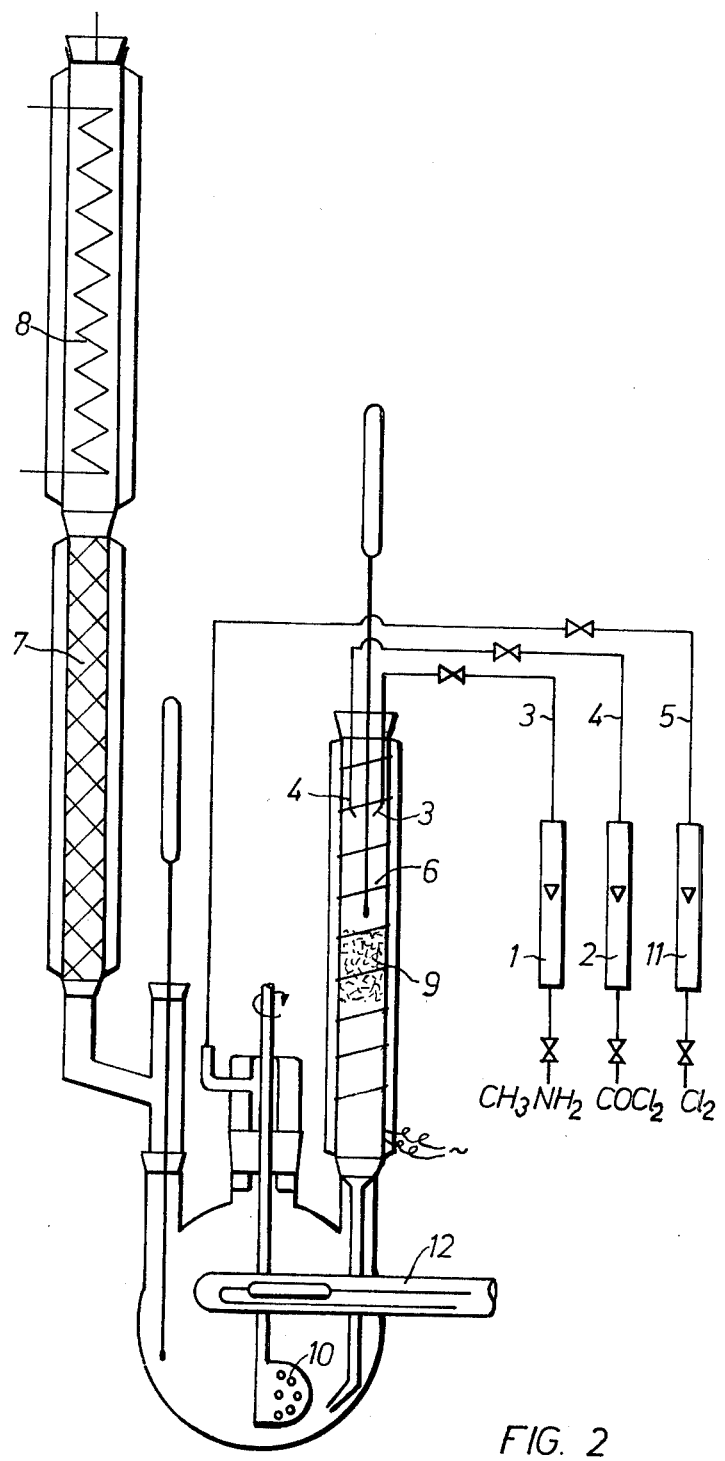
FIG. 2 is a diagrammatic representation of alternate apparatus that can be used to carry out the present invention.

The apparatus used is diagrammatically illustrated in FIG. 2. It consists of a 1 liter capacity three-necked flask of which the middle neck is provided with a stirrer 10 in the form of a gas inlet pipe with a frit closure. One of the side necks carries an electrically heatable reaction tube 6 at whose centre is a plug 9 of glass wool. The unheated, lower end of the reaction tube continues as an inlet pipe down to the base of the three-necked flask, whilst the upper end is provided with a thermometer and two gas inlet pipes 3 and 4 the nozzles of which are directed towards one another. The second side neck of the three-necked flask carries a 30 cm long column 7 surmounted by an intensive condenser 8 filled with 4 mm diameter Raschig rings. Brine at a temperature of $-25$°C flows through the intensive condenser 8 which, at its upper end, is provided with a waste-gas pipe. The reaction zone of the flask is irradiated with the UV lamp 12 described in Example 1.

105 g of methylamine and 663 g of phosgene were blown into the reaction tube 6 heated to 260°C over a period of 5 hours through the rotameters 1 and 2 and the pipes 3 and 4. The fact that the outlet nozzles of the gas inlet pipes were directed towards one another provides for thorough admixture of the two starting compounds. The methylamine hydrochloride formed in small quantities as secondary product was collected by the plug 9 of glass wool arranged in the middle of the reaction tube, so that it was unable to condense and give rise to blockages at the colder outlet of the reaction tube. Instead, it reacted with the excess of phosgene to form methyl carbamic acid chloride and methyl isocyanate and hydrogen chloride.

The three-necked flask was filled with 400 g of carbon tetrachloride, maintained at a temperature of 35° to 40°C and irradiated with UV-light from the UV-lamp 12, in the same way as described above. Whilst the reaction mixture of methyl carbamic acid chloride and methyl isocyanate and hydrogen chloride entered the carbon tetrachloride from the reaction tube, chlorine was simultaneously introduced with stirring at a rate of 50 g per hour through the stirrer 10 by way of the rotameter 11 and the pipe 5.

By regulating the throughflow of brine, the temperature of the intensive condenser 8 was regulated so that a good reflux was maintained in the column 7.

After the reaction mixture of methylamine and phosgene had been introduced for 5 hours, as described, chlorine was introduced into the reaction mixture at a rate of 40 g per hour for 2 hours at approximately 40°C, and then for 3 hours while the temperature was uniformly increased to approximately 70°C, and finally for another 12 hours at approximately 70°C.

The reaction mixture obtained was then worked up by fractional distillation. 495 g (90.5% of the theoretical yield) of N-chlorocarbonyl isocyanide dichloride were obtained in the boiling range from 115° to 117°C/760 Torr, whilst 19 g of a higher-boiling residue remained.

EXAMPLE 5

Reaction vessels I and II of the apparatus illustrated diagrammatically in FIG. 1 were used for the production of N-chlorocarbonyl isocyanide dichloride. Reaction vessel III was omitted.

The light was provided by fluorescent tubes with an optimum spectral radiant power distribution at 340 to 400 nm.

Before the beginning of chlorination, reaction vessel I was filled with 1.5 kg and reaction vessel II with 2.25 kg of N-chlorocarbonyl isocyanide dichloride, and both vessels were heated to 100°C.

30 g/h of methyl isocyanate and, at the same time, 115 g/h of chlorine were introduced into reaction vessel I. The reaction mixture, of which about 95% consisted of the end product, was transferred to reaction vessel II and reacted with another 25 g/h of chlorine. The crude product which flowed off from reaction vessel II was freed from excess chlorine in a heated Raschig-ring column and then separated from the residue in a thin-layer evaporator.

9150 g of 99.5% N-chlorocarbonyl isocyanide dichloride were obtained for a throughput of 3590 g of methyl isocyanate over a period of 120 hours. The residue weighed 175 g. Yield: 90% of the theoretical yield.

What is claimed is:

1. In a process for preparing N-chlorocarbonyl isocyanide dichloride by chlorinating methyl isocyanate and/or methyl carbamic acid chloride optionally in solution in the presence of ultraviolet light at elevated temperatures, the improvement comprising chlorinating at a temperature in the range of from 30° to 120°C and controlling the temperature pattern during the reaction in relation to the concentration of methyl isocyanate in the reaction mixture in such a manner that low temperatures are maintained for high concentrations while high temperatures are maintained with low concentrations.

2. Process of claim 1 wherein a temperature of from 30° to 40°C is maintained during the reaction when the concentration of methyl isocyanate in the reaction mixture is substantially more than 50%; wherein the temperature is increased to 65° to 75°C when said concentration is in the range from 50 to 10%; and wherein the temperature is increased above 75°C when said concentration is substantially below 10%.

3. Process of claim 1 wherein with a concentration of substantially more than 50% of methyl isocyanate in the reaction mixture, chlorination is started at a temperature of from 30° to 40°C and completed by increasing the temperature.

4. Process of claim 1 wherein N-chlorocarbonyl isocyanide dichloride is used as solvent.

5. Process of claim 1 wherein a concentration of methyl isocyanate which does not exceed about 5% is maintained in the reaction mixture.

* * * * *